Jan. 21, 1941. V. MONNIER Re. 21,699

PHIAL

Original Filed Aug. 26, 1936

Inventor
Vital Monnier,
By Charles B. Belknap
Attorney

Reissued Jan. 21, 1941

Re. 21,699

UNITED STATES PATENT OFFICE 21,699

PHIAL

Vital Monnier, Lausanne, Switzerland

Original No. 2,099,370, dated November 16, 1937, Serial No. 98,100, August 26, 1936. Application for reissue October 17, 1939, Serial No. 299,911. In Switzerland September 7, 1935

7 Claims. (Cl. 215—37)

A phial is now made of a glass bulb which is sealed in a flame and in which are kept medical preparations intended to be inhaled, or solutions for injection, and which are thus kept aseptic. A phial-tube is also known for which a special syringe is necessary.

The phials which require a file for cutting them or breaking them present disadvantages such as untimely breakage, defective files, possibility of forgetting the file, etc., and also present the danger of small fragments of glass being accidentally introduced either for example in the syringe, or even in the body of the patient.

The phial-tube further presents in addition to the disadvantage of a special syringe, the danger of having as a closing means a cap the centre of which is provided with an orifice through which the needle passes and where in consequence bacteria, germs in the air and dust must inevitably accumulate.

The present invention overcomes these disadvantages and presents a considerable technical improvement. It relates to an improved phial comprising a metal nonperforated capsule characterized by the feature that the said capsule comprises at least one thin part intended to be pierced by the needle of a syringe without damaging the needle, this capsule covering a member of elastic material comprising at least one orifice, the said member being placed on a metal sheet closing the opening of the phial.

The accompanying drawing shows by way of example two forms of embodiment of the device according to the invention.

Figure 1:
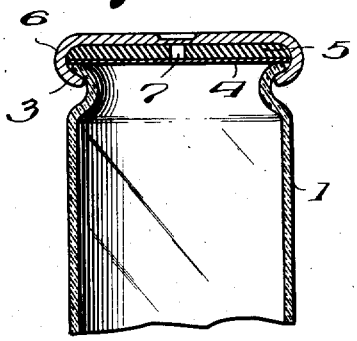
Figure 1 is a view in axial section of a first form of embodiment.

The phial shown in Figures 1, 2, 3 and 4 comprises a relatively thin glass tube 1 provided with a base; the other end of the tube 1 is provided with an opening flared in such a way as to form a circular shoulder. This opening is closed by means of a metal sheet 4 for example of tin, applied on the shoulder 3. On this sheet is placed a plate 5 of compressible material for example such as rubber, which is itself covered by means of a metal cap 6 for example of pressed aluminium secured around the end of the tube 1.

An orifice 7, eccentric or not, is provided through the plate 5; a thin part 8 is arranged in the central part of the cap 6, this thin part as well as the orifice 7 and the sheet 4 being intended to be traversed by the needle of a syringe. The orifice 7 may be replaced by a slot or by two slots 9 arranged in the form of a cross.

The wall of the tube 1 of the container shown being relatively thick, will break only seldom during the various operations such as disinfecting, filling, closing, sterilizing, packing and transport to which the phial is subjected. Before the phial is used, the caps 6 can easily be sterilized either by means of a flame or a disinfectant. The contents of the tube 1 can be aspirated by means of a syringe, the needle of which can easily perforate the metal cap 6 without being blunted, the said metal cap 6 comprising for this purpose a very thin part 8. The needle of the nozzle then passes firstly through the plate of compressible material and secondly through the tin plate 4. The contents of the phial can then be aspirated without difficulty due to the presence of the orifice 7 provided in the rubber plate which prevents the formation of a vacuum in the phial which may be capable of preventing the discharge.

A fluid-tight seal of the phial illustrated is ensured due to the plate of compressible material, the phial being thus of the kind termed "universal type."

Figure 5:
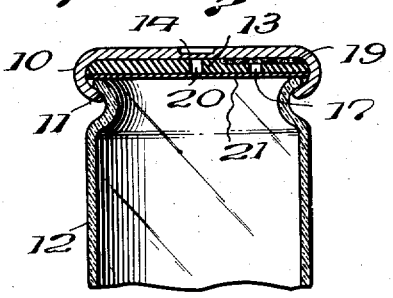
Figure 5 is a view in axial section of a second form of embodiment.
Figure 2:
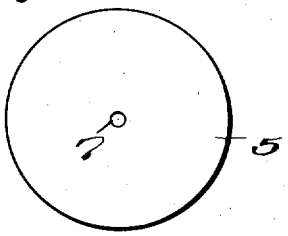
Figures 2 and 3 are plan views of two members of elastic material.
Figure 6:
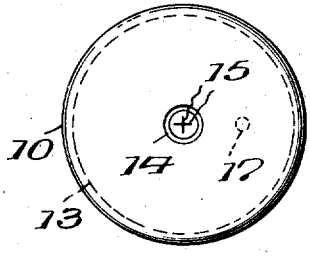
Figure 6 is a plan view of second form of embodiment.
Figure 3:
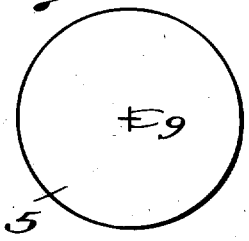
Figure 7:
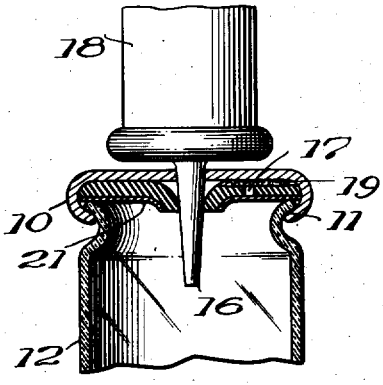
Figure 7 is a view in axial section of the second form of embodiment, the closure of the phial being traversed by the nozzle of a syringe.
Figure 4:
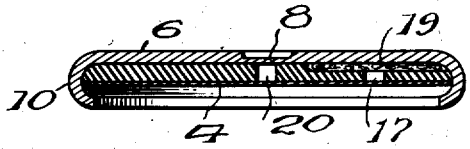
Figure 4 is a view on a large scale of a metal cap, sealing means and filter.

The phial shown in Figures 5, 6 and 7 comprises a closure provided with a metal nonperforated capsule 10, for example of aluminium, fastened or crimped around a circular shoulder 11 provided with a tube 12; the said capsule 10 provided with a thin part 14 is secured on a member 13, for example a rubber washer. The capsule 10 comprises two incisions 15 the depth of which is less than the thickness of the capsule, these incisions being intended to facilitate the subsequent perforation of the capsule 10 by the nozzle 16 of a hypodermic syringe 18.

The member 13 which is placed on a tin sheet 21 closing the opening of the phial comprises firstly an orifice 20 opposite the thin part 14 intended for the passage of the nozzle 16, and secondly an orifice 17 for the aspiration of the solution contained in the phial 12 when the contents are discharged by means of a syringe 18. The orifice 17 of the member 13 is covered with a sterilized filter 19.

The closure of the phial shown permits the solution contained in a phial 12 to be aspirated by means of a syringe 18, the nozzle 16 of which is previously cleaned and sterilized for its passage through the orifice 20 without any danger of pollution of the said solution. The solution is subsequently injected by means of a needle arranged for this use at the end of the nozzle 16. It will be understood that the shape and volume of the phials may be variable as desired.

I claim:

1. Phial for containing medicinal preparations comprising a metallic non-perforated capsule, said capsule comprising at least one thin part intended to be pierced by the point of the needle of a syringe without damaging the needle, the said capsule covering a member of elastic material provided with at least two orifices, one of which is located opposite the thin part of the capsule and permits the penetration of the nozzle of a hypodermic syringe for aspirating the contents of the phial, the other orifice preventing the formation of a vacuum in the phial and being provided with a sterilized filter, the said member of elastic material being placed on at least one metallic sheet closing the opening of the phial.

2. Phial for containing medicinal preparations comprising a metallic non-perforated capsule, said capsule comprising at least one thin part intended to be pierced by the point of the needle of a syringe without damaging the needle, the said capsule covering a member of elastic material provided with at least two orifices, one of which is located opposite the thin part of the capsule and permits the penetration of the nozzle of a hypodermic syringe for aspirating the contents of the phial, the other orifice preventing the formation of a vacuum in the phial and being provided with a sterilized filter, the said member of elastic material being placed on at least one metallic sheet closing the opening of the phial, the capsule further comprising at least one incision the depth of which is less than the thickness of the wall of the said capsule for facilitating the penetration of the nozzle of a syringe into the said phial.

3. A closure for phials comprising an imperforate metallic cap adapted to be secured to the mouth of the phial and having a relatively thin portion adapted to be pierced by a syringe needle, and sealing means interposed between the cap and the phial including a resilient member having an aperture capable of permitting the entrance of air into the phial when a syringe needle is positioned in the phial to withdraw the contents thereof, said aperture being wholly spaced laterally from said thin portion.

4. A closure for phials comprising an imperforate metallic cap adapted to be secured to the mouth of the phial and having a relatively thin portion adapted to be pierced by a syringe needle, and sealing means interposed between the cap and the phial including a resilient member having an aperture aligned with said thin portion of the cap to permit passage of a syringe needle therethrough, said resilient member having a second aperture capable of permitting the entrance of air into the phial when a syringe needle is positioned in the phial to withdraw the contents thereof.

5. A closure for phials comprising an imperforate metallic cap adapted to be secured to the mouth of the phial and having a relatively thin portion adapted to be pierced by a syringe needle, a resilient sealing disc interposed between the cap and the phial and having an aperture aligned with said thin portion of the cap to permit passage of a syringe needle therethrough, said resilient member having a second aperture capable of permitting the entrance of air into the phial when a syringe needle is positioned in the phial to withdraw the contents thereof, and an imperforate puncturable disc interposed between said sealing disc and said phial and closing both of said apertures.

6. A closure for phials comprising an imperforate metallic cap adapted to be secured to the mouth of the phial and having a relatively thin portion adapted to be pierced by a syringe needle, sealing means interposed between the cap and the phial including a resilient member having an aperture capable of permitting the entrance of air into the phial when a syringe needle is positioned in the phial to withdraw the contents thereof, said aperture being wholly spaced laterally from said thin portion, and sterilized filtering means overlying said aperture.

7. A closure for phials comprising an imperforate metallic cap adapted to be secured to the mouth of the phial and having a relatively thin portion adapted to be pierced by a syringe needle, sealing means interposed between the cap and the phial including a resilient member having an aperture aligned with said thin portion of the cap to permit passage of a syringe needle therethrough, said resilient member having a second aperture capable of permitting the entrance of air into the phial when a syringe needle is positioned in the phial to withdraw the contents thereof, and sterilized filtering means overlying said second aperture.

V. MONNIER.